US012258241B2

(12) United States Patent
Lampinen et al.

(10) Patent No.: US 12,258,241 B2
(45) Date of Patent: Mar. 25, 2025

(54) ELEVATOR INCLUDING SAFETY MONITORING THAT PREVENTS EXCESSIVE DECELERATION DURING SLOWDOWN FAILURE

(71) Applicant: Kone Corporation, Helsinki (FI)

(72) Inventors: Riku Lampinen, Helsinki (FI); Juha-Matti Aitamurto, Helsinki (FI)

(73) Assignee: Kone Corporation, Helsinki (FI)

( * ) Notice: Subject to any disclaimer, the term of this patent is extended or adjusted under 35 U.S.C. 154(b) by 1625 days.

(21) Appl. No.: 16/458,971

(22) Filed: Jul. 1, 2019

(65) Prior Publication Data

US 2020/0024105 A1 Jan. 23, 2020

(30) Foreign Application Priority Data

Jul. 23, 2018 (EP) .................................... 18185012

(51) Int. Cl.
*B66B 1/28* (2006.01)
*B66B 5/00* (2006.01)
*B66B 5/06* (2006.01)

(52) U.S. Cl.
CPC .............. *B66B 5/0031* (2013.01); *B66B 1/28* (2013.01); *B66B 5/06* (2013.01)

(58) Field of Classification Search
CPC ......... B66B 1/24; B66B 1/28–30; B66B 1/32; B66B 1/3492–365; B66B 1/44;
(Continued)

(56) References Cited

U.S. PATENT DOCUMENTS 7,448,471 B2 * 11/2008 Nuebling .............. B66B 5/0031 187/300
2008/0128217 A1 * 6/2008 Kattainen ................. B66B 1/28 187/373
(Continued)

FOREIGN PATENT DOCUMENTS

WO WO-2006082274 A2 8/2006
WO WO-2006082275 A2 8/2006
(Continued)

OTHER PUBLICATIONS

European Search report, 18185012, Jan. 18, 2019.

*Primary Examiner* — Christopher Uhlir
(74) *Attorney, Agent, or Firm* — Harness, Dickey & Pierce, P.L.C.

(57) ABSTRACT

An elevator including an elevator shaft defined by top and bottom end terminals; an elevator car vertically movable in the elevator shaft; an elevator hoisting machinery drives the elevator car; an electromechanical braking apparatus that brakes movement of the elevator car; a first measuring device that provides first position data and first speed data of the elevator car; a second measuring device that provides at least second position data of the elevator car; and a safety monitoring unit communicatively connected to the first and second measuring devices and that determines a synchronized position of the elevator car from the first and second position data, and determines an elevator car slowdown failure in proximity of the top or bottom end terminals from the first speed data and the synchronized position. The safety monitoring unit causes braking of the elevator car with the electromechanical braking apparatus upon determination of slowdown failure.

19 Claims, 3 Drawing Sheets

(58) Field of Classification Search
CPC ........... B66B 1/48; B66B 5/00; B66B 5/0006; B66B 5/0018–0037; B66B 5/02; B66B 5/04; B66B 5/06
See application file for complete search history.

(56) References Cited

U.S. PATENT DOCUMENTS

| | | | | |
|---|---|---|---|---|
| 2016/0152440 | A1 | 6/2016 | Hopp | |
| 2016/0167921 | A1* | 6/2016 | Kattainen | B66B 1/24 187/289 |

FOREIGN PATENT DOCUMENTS

| | | | |
|---|---|---|---|
| WO | WO-2008102051 | A1 | 8/2008 |
| WO | WO-2011051571 | A1 | 5/2011 |
| WO | WO-2011086230 | A1 | 7/2011 |
| WO | WO-2015036650 | A1 | 3/2015 |

* cited by examiner

ELEVATOR INCLUDING SAFETY MONITORING THAT PREVENTS EXCESSIVE DECELERATION DURING SLOWDOWN FAILURE

This application claims priority to European Patent Application No. EP18185012.4 filed on Jul. 23, 2018, the entire contents of which are incorporated herein by reference.

BACKGROUND

The present invention relates to elevator speed monitoring. Elevators have electromechanical brakes that apply to a traction sheave or rotating axis of a hoisting machine to stop movement of the hoisting machine and therefore an elevator car driven by the hoisting machine. A hoisting machine normally has two electromechanical brakes. The brakes have to be dimensioned to stop and hold an elevator car with 125% load (25% overload) at standstill in the elevator shaft. The brakes may be used in rescue situations and in emergency braking to stop the elevator car if an operational fault occurs, such as an overspeed situation of the elevator car or a power failure.

Traditionally elevator is driven with steel ropes running via the traction sheave of the hoisting machine. When hoisting machinery brakes are closed to stop elevator car movement, steel ropes slip on the traction sheave to reduce deceleration of the elevator car, which deceleration might otherwise be uncomfortable or even dangerous to the elevator passengers.

Recently new kind of coated hoisting ropes have been introduced. These may be traditional round steel ropes with a high-friction coating, or belts with high-friction coating, such as a polyurethane coating. Load-carrying parts of the belts may be steel cords or they can be made of synthetic fibers, such as glass fibers or carbon fibers, for example.

These new kind of coated hoisting ropes cause a higher friction between the ropes and the traction sheave. Reduction in slipping of the ropes on the traction sheave may lead to increased deceleration of elevator car in the emergency stopping situation, which is a non-desired condition for the elevator passengers.

SUMMARY

According to the invention, an elevator is provided. The elevator comprises: an elevator shaft defined by surrounding walls and top and bottom end terminals; an elevator car vertically movable in the elevator shaft; an elevator hoisting machinery adapted to drive the elevator car; an electromechanical braking apparatus configured to brake movement of the elevator car; a first measuring device adapted to provide first position data and first speed data of the elevator car; a second measuring device adapted to provide at least second position data of the elevator car; and a safety monitoring unit communicatively connected to the first measuring device and the second measuring device. The safety monitoring unit is configured to determine a synchronized position of the elevator car from the first and the second position data, and to determine an elevator car slowdown failure in the proximity of the top or the bottom end terminal from the first speed data and from the synchronized position of the elevator car. The safety monitoring unit is adapted to cause braking of the elevator car at least with the electromechanical braking apparatus upon determination of the slowdown failure.

Synchronized position means position data provided by the first measuring device and then verified and, if necessary, also corrected by means of independent position data from the second measuring device, to improve reliability and accuracy and thus safety of said position data. In an embodiment, the first measuring device is a pulse sensor unit and the second measuring device is a door zone sensor.

This can mean that a distributed electronic safety system with a programmable safety monitoring unit and measuring devices communicatively connected to the programmable safety monitoring unit is used to perform the safety-related ETSL (emergency terminal speed limit) elevator braking function. The first measuring device may be flexibly disposed in suitable positions in the elevator system. For example, the first measuring device may be a pulse sensor unit mounted to suitable elevator components, such as to an elevator car, to an overspeed governor, to a guide roller of an elevator car and/or at one or more elevator landings.

According to an embodiment, the pulse sensor unit is mounted to rope pulley of an elevator car. Elevator car may be suspended on the hoisting ropes through the rope pulley. The pulse sensor unit may be adapted to measure rotation speed of the rope pulley. Rotation speed of the rope pulley indicates speed of the hoisting ropes running via the rope pulley, and therefore speed of the car.

According to an embodiment, the elevator comprises a safety buffer of an elevator car associated with the bottom end terminal of the elevator shaft.

According to an embodiment, the safety monitoring unit is adapted to cause braking of the elevator car with the electromechanical braking apparatus to decelerate car speed to the terminal speed of the top or bottom end terminal upon determination of the slowdown failure. Terminal speed of the top or bottom end terminal means highest allowed speed at said top or bottom end terminal. Highest allowed speed of the top end terminal may be zero speed, to avoid collision at the top end terminal. If the elevator comprises a safety buffer of an elevator car associated with the bottom end terminal of the elevator shaft, terminal speed of the bottom end terminal may be the allowed buffer impact speed, i.e. the highest allowed structural speed of the safety buffer for elevator car to safely hit the buffer.

According to an embodiment, the elevator further comprises an inductive braking apparatus configured to brake movement of the elevator car. The safety monitoring unit is adapted to cause braking of the elevator car with the electromechanical braking apparatus in tandem with the inductive braking apparatus to decelerate car speed to the terminal speed of the top or bottom end terminal upon determination of the slowdown failure. The inductive braking apparatus means a braking apparatus operating on inductive power, such as a dynamic braking apparatus which generates braking torque by short-circuiting windings of a rotating hoisting machinery. Therefore braking current is generated from the electromotive force caused by rotation of the hoisting machinery.

According to an embodiment, the electromechanical braking apparatus is used for the safety-related ETSL (emergency terminal speed limit) elevator braking function.

According to another embodiment, an inductive braking apparatus is used in tandem with an electromechanical braking apparatus for the safety-related ETSL (emergency terminal speed limit) elevator braking function. A smaller electromechanical braking apparatus, i.e. an electromechanical braking apparatus dimensioned for smaller braking torque, may be used, for example, in elevators in high-rise buildings, because the braking torque of the inductive braking apparatus can be taken into account when dimensioning the overall ETSL braking system. By means of this smaller electromechanical braking apparatus deceleration of the elevator car may be reduced to an acceptable level also in elevators with coated hoisting ropes, in particular in high-rise elevators with coated hoisting ropes.

According to an embodiment, the safety monitoring unit is configured to calculate from the current speed data onwards, with the maximum acceleration, speed prediction for the elevator car speed after reaction time of the electromechanical braking apparatus and to calculate from the current synchronized position onwards, with the maximum acceleration, the closest possible position of an approaching elevator car to the top or bottom end terminal after reaction time of the electromechanical braking apparatus, to calculate a maximum initial speed for the elevator car to decelerate from said closest possible position to the terminal speed of said top or bottom end terminal, and to determine an elevator car slowdown failure if said speed prediction meets or exceeds said maximum initial speed. Maximum acceleration means highest possible (constant or variable) acceleration of the elevator car within capacity of the drive system. Reaction time of the electromechanical braking apparatus means time delay from detection of fault by the safety monitoring unit to the moment electromechanical braking apparatus actually engages the rotating part of the hoisting machinery (in case of hoisting machinery brakes) or elevator guide rail (in case of car brake) and starts braking of the elevator car.

According to an embodiment, the electromechanical braking apparatus comprises two electromechanical brakes adapted to apply a braking force to brake movement of the elevator car. Thus braking action with adequate braking force may be performed even if one electromechanical brake fails (fail-safe operation).

According to an embodiment, the electromechanical braking apparatus comprises two electromechanical hoisting machinery brakes.

According to an embodiment, the electromechanical braking apparatus comprises one or more car brakes, which is/are mounted to elevator car and adapted to brake elevator car movement by engaging (e.g. wedging or pressing) against a longitudinal braking element(s), such as guide rail(s) of elevator car and/or guide rail(s) of elevator counterweight.

According to an embodiment, the inductive braking apparatus comprises at least one, preferably at least two inductive braking devices.

According to an embodiment, the elevator comprises: a first monitoring circuit configured to indicate operation of the electromechanical braking apparatus; a second monitoring circuit configured to indicate operation of the inductive braking apparatus; and a control device communicatively connected to the first monitoring circuit and to the second monitoring circuit, the control device configured to cause a safety shutdown of the elevator on the basis of a communication indicating a malfunction of at least one of the electromechanical braking apparatus and the inductive braking apparatus. In a preferred embodiment, the control device is the safety monitoring unit.

According to an embodiment, the first monitoring circuit comprises a sensor, such as a switch or a proximity sensor for sensing position and/or movement of an armature of the electromechanical brake.

According to an embodiment, the inductive braking device comprises a mechanical contactor having at least two contacts adapted to short phases of an elevator hoisting machinery, and wherein the second monitoring circuit comprises at least two auxiliary contacts of the mechanical contactor, said auxiliary contacts co-acting with the at least two contacts, respectively, to indicate switching state of the at least two contacts.

According to an alternative embodiment, the inductive braking device comprises at least two solid state switches adapted to short phases of the elevator hoisting machinery. The solid state switches may belong to the inverter which supplies electrical power to the elevator hoisting machinery.

According to an embodiment, the electromechanical braking apparatus is dimensioned to stop the elevator car when it is travelling downward at nominal speed and with a 25% overload.

According to an embodiment, the combination of the electromechanical braking apparatus and the inductive braking apparatus is dimensioned to decelerate car speed from the maximum initial speed to the terminal speed of said top or bottom end terminal within the distance between the closest possible position of an approaching elevator car and the top or bottom end terminal.

According to an embodiment, the safety monitoring unit is adapted to provide a common control signal to control the electromechanical braking apparatus in tandem with the inductive braking apparatus.

According to an embodiment, the safety monitoring unit is adapted to provide separate control signals for the electromechanical braking apparatus and the inductive braking apparatus.

The term "inductive braking apparatus" means a braking apparatus operated by inductive power, e.g. power generated by the braking/regenerating motor of the hoisting machinery. According to an embodiment, a motor inverter operating in regenerative mode, receiving electrical power from the motor is an "inductive braking apparatus".

According to an embodiment, the inductive braking apparatus is a dynamic braking apparatus comprising an elevator hoisting motor and one or more switches adapted to provide a short-circuit to windings of the elevator hoisting motor. In some embodiments, the dynamic braking apparatus comprises two elevator hoisting motors mounted to the same hoisting machinery. The dynamic braking apparatus further comprises switches adapted to provide a short-circuit to the winding of said two elevator hoisting motors.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

The following description illustrates a solution that monitors elevator car movement in the proximity of end terminals of elevator shaft. In case of slowdown failure of the elevator car, emergency stop may be performed to bring elevator to a safe state. This solution may constitute an ETSL (emergency terminal speed limiting device) safety function required by elevator safety rules (EN 81-20 2014 paragraph 5.12.1.3; A17.1 2016 paragraph 2.25.4.1).

Figure 1A:
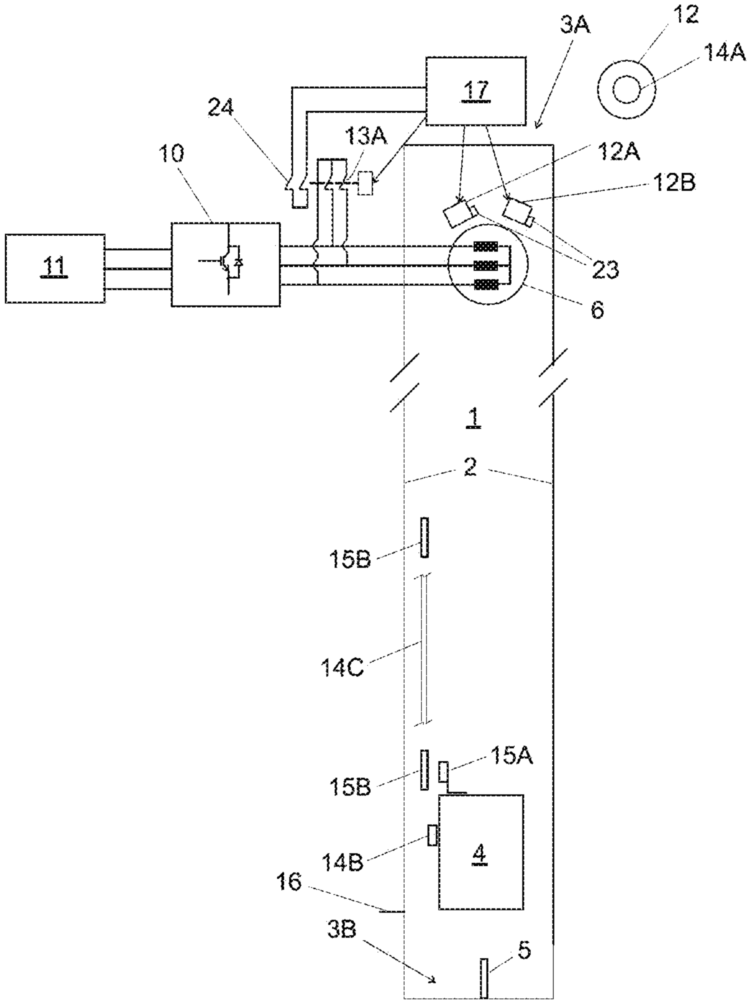
FIG. 1A illustrates a sideview of an elevator according to an embodiment.
Figure 1B:
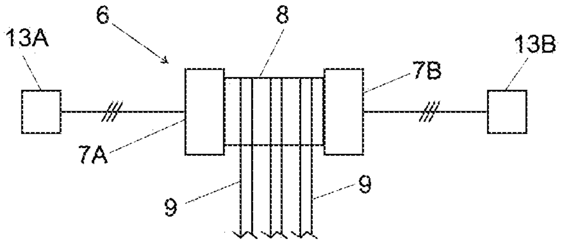
FIG. 1B illustrates a frontview of an elevator hoisting machinery suitable to the embodiment of FIG. 1A.

FIG. 1A illustrates an elevator having an elevator car 4 and a counterweight, which are arranged to move vertically in an elevator shaft 1, which is defined by surrounding walls 2 and top 3A and bottom 3B end terminals. Elevator comprises a hoisting machinery 6 including a rotating sheave 8. Hoisting ropes 9 of the elevator car 4 run via the sheave 8. When the sheave 8 rotates, elevator car 4 moves in a first vertical direction and the counterweight moves is a second, opposite direction. As depicted in FIG. 1B, hoisting machinery 6 of FIG. 1A may contain two permanent magnet motors 7A, 7B arranged on the same rotating axis with the sheave 8. Electrical power to the permanent magnet motors 7A, 7B is provided with a drive unit 10 (e.g. a frequency converter) from the mains 11, as illustrated in FIG. 1A. Drive unit 10 performs speed regulation of the elevator car 4 moving between the landings 16 to serve elevator passengers. In some alternative embodiments, the hoisting machinery 6 may contain only one permanent magnet motor. Instead of permanent magnet motor(s), the hoisting machinery 6 may contain a suitable alternative, such as an induction motor, a reluctance motor, a stator-mounted permanent magnet (SMPM) motor or corresponding. Instead of rotating motor, a linear motor may be used to provide propulsion force to the elevator car 4.

The elevator of FIG. 1A is provided with electromechanical hoisting machinery brakes 12A, 12B, as safety devices to apply braking force, either directly to the sheave 8 or via a rotating shaft, to brake movement of the hoisting machinery 6 and therefore the elevator car 4. There are normally two separate brakes 12A, 12B, as illustrated in the FIG. 1A. The brakes 12A and 12B are altogether dimensioned to stop and hold an elevator car with 125% load (25% overload) at standstill in the elevator shaft 1. Additionally or alternatively, elevator may have electromechanical car brakes, which are mounted to the elevator car 4 and which act on guide rails of elevator car 4 to brake movement of the elevator car 4.

Further, the elevator has dynamic braking contactors 13A, 13B. Contacts of the dynamic braking contactors 13A, 13B are connected across the terminals of the permanent magnet motors 7A, 7B of the hoisting machinery 6. When the contacts are closed, they short the windings of the permanent magnet motors 7A, 7B. Shorting of the windings causes dynamic braking current in the windings, when the permanent magnet motors rotate and generate electromotive force (emf). This means that the dynamic braking contactors 13A, 13B together with the permanent magnet motors 7A, 7B act as inductive braking devices. Contacts on the dynamic braking contactors 13A, 13B are NC (normally closed) type, so they are closed when current supply is interrupted to the control coils of the contactors.

In some alternative embodiments, solid state switches, such as bipolar transistors, igbt—transistors, mosfet—transistors, silicon carbide (SiC) transistors or gallium nitride transistors are used instead of mechanical dynamic braking contactors 13A 13B.

According to the embodiment of FIG. 1A, the inductive braking devices 13A, 13B; 7A, 7B operate as an assistive brake for the electromechanical hoisting machinery brakes 12A, 12B. When the elevator car 4 moves in the proximity of the end terminal 3A, 3B (that is, in the shaft section where the speed of an approaching elevator elevator car is decelerated from nominal speed to the allowed terminal speed of the end terminal 3A, 3B), an ETSL (Emergency Terminal Speed Limit) safety function is used for speed monitoring of the elevator car. The inductive braking device 13A, 13B; 7A, 7B is used in tandem with the electromechanical hoisting machinery brakes 12A, 12B to perform the emergency stop actuated by the ETSL safety function. Thus, less braking force is required from the electromechanical brakes, and the electromechanical brakes may be dimensioned to be smaller. The ETSL safety function is implemented in the safety program of the safety monitoring unit 17, which is a programmable elevator safety device fulfilling safety integrity level 3 (SIL 3).

The elevator of FIG. 1A has a first measuring device 14A, 14B, 14C adapted to provide first position data and first speed data of the elevator car. In some embodiments the first measuring device is a pulse sensor unit 14A, 14B. Pulse sensor unit 14A may comprise a magnet ring arranged in the overspeed governor OSG 12. Alternatively, in the pulse sensor unit 14B the magnet ring may be arranged in a roller guide RG of the elevator car 4. The pulse sensor unit 14A, 14B may comprise at least one quadrature sensor, one or more processors, one or more memories being volatile or non-volatile for storing portions of computer program code and any data values, a communication interface and possibly one or more user interface units. The mentioned elements may be communicatively coupled to each other with e.g. an internal bus. The at least one quadrature sensor is configured to measure incremental pulses from the rotating magnet ring arranged in OSG or RG. The magnetic ring may comprise alternating evenly spaced north and south poles around its circumference. The at least one quadrature sensor may be a Hall sensor, for example. Furthermore, the at least one quadrature sensor has an A/B quadrature output signal for the measurement of magnetic poles of the magnet ring. Furthermore, the at least one quadrature sensor may be configured to detect changes in the magnetic field as the alternating poles of the magnet pass over it. The output signal of the quadrature sensor may comprise two channels A and B that may be defined as pulses per revolution (PPR). Furthermore, the position in relation to the starting point in pulses may be defined by counting the number of pulses. Since, the channels are in quadrature more, i.e. 90 degree phase shift relative to each other, also the direction the of the rotation may be defined. The communication interface provides interface for communication with the at least one quadrature sensor and with the safety monitoring unit 17. The communication interface may be based on one or more known communication technologies, either wired or wireless, in order to exchange pieces of information as described earlier. Preferably, the communication interface may be implemented as a safety bus with at least partly duplicated communication means.

The processor of the pulse sensor unit is at least configured to obtain the quadrature signal from the at least one quadrature sensor, define the pulse position information based on the quadrature signals, define speed based on pulse intervals and/or number of pulses per time unit, and to store the defined pulse position information and speed into the memory. The processor is thus arranged to access the memory and retrieve and store any information therefrom and thereto. For sake of clarity, the processor herein refers to any unit suitable for processing information and control the operation of the pulse sensor unit, among other tasks. The operations may also be implemented with a microcontroller solution with embedded software. Similarly, the memory is not limited to a certain type of memory only, but any memory type suitable for storing the described pieces of information may be applied in the context of the present invention.

In an alternative embodiment, the first measuring device 14C may be implemented with a tape extending along elevator car trajectory in the shaft 1. The tape may contain readable markings. The readable markings may be for example optically readable markings, such as a barcode or 2D barcode, or in the form of variable magnetic field, which can be read with a suitable sensor, such as one or more hall-sensors. Elevator car may have a suitable reader device adapted to read the markings of the tape. The reader device may be configured to determine first elevator car position from the markings of the tape, as well as elevator car speed from the timely variation of the markings as elevator car 4 passes them. The reader device may be communicatively connected to the safety monitoring unit 17 via a suitable communication channel, such as a safety bus.

Further, the elevator of FIG. 1A has a second measuring device 15A, 15B. In the embodiment of FIG. 1A the second measuring device is a door zone sensor comprising a reader device 15 A mounted to elevator car 4 and magnets 15B mounted to each landing 16 to indicate door zone position, i.e. the position at which landing floor and elevator car floor are at same level to allow entering or exiting the car. The reader device has hall sensors and a processor. Reader device 15A is adapted to read variation of magnetic field from the magnet 15B and determine linear door zone position of the elevator car 4 therefrom. Each magnet 15B may also comprise an identification of the magnet. Identification may be included in the magnetic field pattern of the magnet 15B. Identification may also be implemented with a separate portion, such as with an rfid tag. In this case reader device 15A may comprise an rfid tag reader. With the identification it is possible to determine absolute door zone position of the elevator car 4 when car arrives to the magnet 15B. The reader device 15A is communicatively connected to the safety monitoring unit 17 via a suitable communication channel, such as a safety bus running in the travelling cable between elevator car 4 and the safety monitoring unit 17.

Every time the elevator car 4 arrives to the landing magnet 15B (e.g. stops to the magnet or passes it), absolute door zone position of elevator car 4 is determined and sent to the safety monitoring unit 17. During normal operation, safety monitoring unit 17 compares the first elevator car position received from the first measuring device 14A, 14B, 14C with the absolute door zone position received from the second measuring device 15A, 15B and synchronizes the first position information with the absolute door zone position. Thus, if there is only a minor difference between the compared positions, safety monitoring unit 17 corrects the first position information by adding a correction term to the first position information such that the first position information corresponds to the absolute door zone position of the second measuring device. If the comparison leads to the conclusion that the difference between first position information and absolute door zone position is too high to be allowable, safety monitoring unit 17 cancels normal elevator operation until a corrective measure, such as a maintenance operation or a low-speed calibration run of the elevator car is carried out.

Alternatively or in addition, the first position information and/or elevator car speed and/or the absolute door zone position information of the elevator car 4 may be defined at two channels in order to certainly meet the SIL3 level reliability. In order to define two-channel position/speed information the pulse position information and door zone information may be obtained at two channels. The two-channel pulse position and speed information may be obtained from of the pulse sensor unit comprising one quadrature sensor and at least one processor at each channel. Furthermore, the two-channel door zone position information may be obtained from the door zone sensor unit comprising at least one Hall sensor and at least one processor at each channel. The above presented method safety control unit, and elevator system may be implemented for two channels similarly as described above for one channel.

Figure 2:
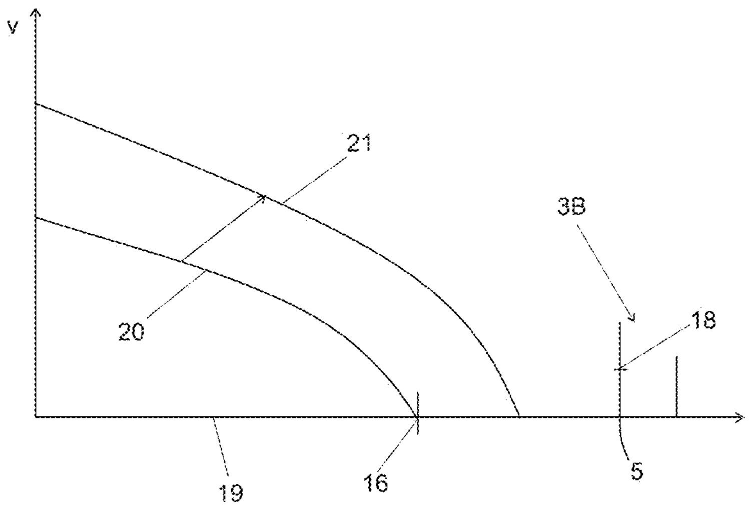
FIG. 2 illustrates implementation of speed prediction for elevator car speed according to an embodiment.
Figure 3:
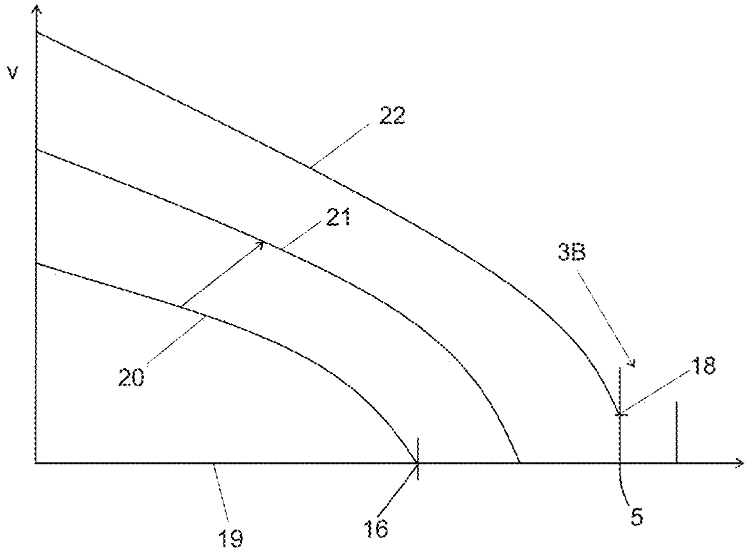
FIG. 3 illustrates determination of elevator car slowdown failure according to an embodiment.

Next, FIGS. 2 and 3 are used to illustrate how the ETSL safety monitoring function is carried out by means of the safety monitoring unit 17.

As already mentioned above, the safety monitoring unit 17 receives first position data of elevator car from the first measuring device 14A, 14B, 14C and absolute door zone position information (second position data) from the door zone sensor (second measuring device) and determines synchronized position 19 of the elevator car from the first and second position data.

Safety monitoring unit 17 receives also elevator car speed data from the first measuring device 14A, 14B, 14C. By means of the synchronized position and the elevator car speed data, safety monitoring unit 17 performs ETSL monitoring. When the ETSL monitoring results in determining a slowdown failure of an elevator car approaching the end terminal 3A, 3B of the elevator shaft, safety monitoring unit 17 causes braking of the elevator car 4 with the electromechanical hoisting machinery brakes 12A, 12B in tandem with the inductive braking devices 13A, 13B; 7A, 7B. Next, more detailed implementation of the ETSL monitoring is disclosed.

In FIG. 2 it is illustrated, how the safety monitoring unit 17 calculates from the current speed data 20 ($v_0$) onwards, with the maximum acceleration ($a_{max}$), speed prediction 21 ($v_p$) for the elevator car speed after reaction time tr of the electromechanical hoisting machinery brakes 12A, 12B:

$$v_p = v_0 + \int_0^{t_r} a_{max}(t)\,dt. \tag{1}$$

Maximum acceleration $a_{max}$ means the highest possible constant or variable acceleration of the elevator car within capacity of the drive system; in other words the highest possible acceleration of elevator car in case of an operational anomaly of the drive system. Therefore, the speed prediction 21 ($v_p$) gives the worst-case scenario for elevator car speed in case of an operational anomaly. Reaction time $t_r$ means estimated time delay from detection of a fault by the safety monitoring unit 17, to the moment that braking torque of the hoisting machinery brakes 12A, 12B has increased to an adequate level, to decelerate elevator car 4 movement. In some embodiments the adequate level is nominal braking torque. In some other embodiments the adequate level may be lower, for example ⅔ of the nominal braking torque.

Turning now to FIG. 3, the safety monitoring unit 17 calculates from the current synchronized position 19 ($x_0$) onwards, with the maximum acceleration $a_{max}$, the closest possible position ($x_p$) of an approaching elevator car 4 to the top 3A or bottom 3B end terminal of the elevator shaft 1 after reaction time $t_r$ of the electromechanical braking apparatus 12A, 12B:

$$x_p = x_0 + v_0 t_r + \iint_0^{t_r} a_{max}(t)\,d^2t \tag{2}$$

Therefore, the calculated closest possible position $x_p$ gives the worst-case scenario for the initial position when braking of the approaching elevator car starts in case of an operational anomaly of the drive system.

The safety monitoring unit 17 calculates maximum initial speed 22 ($v_{lim}$) for the elevator car 4 to decelerate, with the minimum average deceleration $a_{br}$ resulting from the combined (average) braking torque of the hoisting machinery brakes 12A, 12B and the inductive braking device 13A, 13B; 7A, 7B from said closest possible position $x_p$ to the terminal speed $v_t$ of said top 3A or bottom 3B end terminal:

$$v_{lim}=\sqrt{v_t^2+2a_{br}*x_p}-v_s \qquad (3)$$

In the current embodiment terminal speed $v_t$ of top end terminal 3A is zero and terminal speed $v_t$ of bottom end terminal 3B is highest allowed buffer impact speed 18. Buffer impact speed depends on the dimensioning of the safety buffer 5 and it could be, for example a fixed value between 3.5 m/s and 1 m/s. However the value could be even higher or lower.

The safety monitoring unit 17 determines an elevator car slowdown failure if the speed prediction 21 (worst-case scenario for elevator car speed) $v_p$ exceeds the maximum initial speed 22 $v_{lim}$. In some embodiments, an application-specific safety margin $v_s$ is also added to the equation (3) above to slightly lower the slowdown failure tripping limit $v_{lim}$. The safety margin $v_s$ may be, for example, 2-5% of the nominal travelling speed of the elevator car 4. Upon determination of the slowdown failure, the safety monitoring unit 17 generates safety control commands for the hoisting machinery brakes 12A, 12B and the inductive braking device 13A, 13B; 7A, 7B. Safety control command may be, for example, a data signal sent via a safety bus or it may be implemented by cutting a safety signal, which is continuously active during normal elevator operation. Responsive to the safety control command, hoisting machinery brakes are actuated to brake movement of the elevator car 4 and the inductive braking apparatus 13A, 13B; 7A, 7B starts assisting dynamic braking with the motors 7A, 7B to decelerate car speed to the terminal speed of the top 3A or bottom 3B end terminal. In some embodiments the safety monitoring unit 17 generates a common safety control command to control the electromechanical braking apparatus 12A, 12B in tandem with the inductive braking apparatus 13A, 13B. In some alternative embodiments the safety monitoring unit 17 generates separate safety control commands for the hoisting machinery brakes 12A, 12B and the inductive braking devices 13A, 13B such that they may be actuated separately and/or at different times.

Because the hoisting machinery brakes 12A, 12B and inductive braking devices 13A, 13B; 7A, 7B are ETSL safety devices, their operational condition is monitored to assure high safety level. Thus a first monitoring circuit 23 in the form of movement sensors is mounted to the hoisting machinery brakes. Movement sensors may be, for example, switches or proximity sensors adapted to measure movement or position of the hoisting machinery brake armature 12A, 12B relative to brake frame. A mismatch between a control command (e.g. a safety control command), and measured brake armature movement indicates malfunction of the hoisting machinery brake 12A, 12B. Further, a second monitoring circuit is established by means of auxiliary contacts 24 of the dynamic braking contactors 13A, 13B of the inductive braking devices 13A, 13B; 7A, 7B. Auxiliary contacts are normally closed (NC) type and they are connected in series to form a chain that is closed when dynamic braking contactors are de-energized. Thus an open chain of auxiliary contacts of a de-energized contactor indicates a malfunction of the inductive braking apparatus.

The safety monitoring unit 17 is communicatively connected to the first monitoring circuit 23 and to the second monitoring circuit 24 by means of a suitable channel, such as with separate signal wires or a safety bus. The safety monitoring unit 17 is configured to cause a safety shutdown of the elevator on the basis of an indication of a malfunction received from the first 23 or the second 24 monitoring circuit. Safety shutdown can mean that elevator is taken out of operation immediately or after release of the passengers from the elevator car. In an alternative embodiment, in case of indication of malfunction received from the second 24 monitoring circuit, operation is continued with degraded performance, such as with a lower speed.

In an alternative embodiment, the ETSL braking solution disclosed above is implemented without the inductive braking devices 13A, 13B; 7A, 7B of FIG. 1 A and FIG. 1B. In this case the safety monitoring unit 17 is adapted to cause braking of the elevator car 4 with the hoisting machinery brakes 12A, 12B to decelerate car speed to the terminal speed of the top 3A or bottom 3B end terminal upon determination of the slowdown failure. To enable this, the hoisting machinery brakes 12A, 12B are dimensioned to decelerate car speed from the maximum initial speed 22 ($v_{lim}$) to the terminal speed of said top 3 or bottom 3B end terminal within the distance between the closest possible position $x_p$ of an approaching elevator car 4 and the top 3A or bottom 3B end terminal. In this embodiment the average deceleration $a_{br}$ of equation (3) is the deceleration caused by the braking torque of the hoisting machinery brakes 12A, 12B.

According to an embodiment, the electromechanical braking apparatus comprises one or more car brakes, which is/are mounted to elevator car 4 and adapted to brake elevator car 4 movement by engaging against a longitudinal braking element(s), such as guide rail(s) of elevator car 4.

The invention can be carried out within the scope of the appended patent claims. Thus, the above-mentioned embodiments should not be understood as delimiting the invention.

The invention claimed is:

1. An elevator comprising:

an elevator shaft defined by surrounding walls and top and bottom end terminals;

an elevator car vertically movable in the elevator shaft;

an elevator hoisting machinery configured to drive the elevator car;

an electromechanical braking apparatus configured to brake movement of the elevator car;

a first measuring device adapted to provide first position data and first speed data of the elevator car;

a second measuring device configured to provide at least a second position data of the elevator car; and a safety monitoring unit communicatively connected to the first measuring device and the second measuring device and configured to determine a synchronized position of the elevator car from the first and the second position data, and to determine an elevator car slowdown failure in a proximity of the top end terminal or the bottom end terminal from the first speed data and from the synchronized position of the elevator car, wherein the safety monitoring unit is configured to cause braking of the elevator car with the electromechanical braking apparatus upon the determination of the slowdown failure, and wherein the safety monitoring unit is configured to calculate from a current speed data onwards, with a maximum acceleration, a speed prediction for car speed after a reaction time of the electromechanical braking apparatus, calculate from a current synchronized position onwards, with the maximum acceleration, a closest possible position of an approaching elevator car to the top end terminal or the bottom end terminal after the reaction time of the electromechanical braking apparatus, calculate a maximum initial speed for the elevator car to decelerate from said closest possible position to a terminal speed of the top end terminal or the bottom end terminal, and determine the elevator car slowdown failure in response to the speed prediction meeting or exceeding the maximum initial speed.

2. The elevator according to claim 1, wherein the safety monitoring unit is configured to cause the braking of the elevator car with the electromechanical braking apparatus to decelerate the car speed to the terminal speed of the top end terminal or the bottom end terminal upon the determination of the slowdown failure.

3. The elevator according to claim 1, further comprising a safety buffer of the elevator car associated with the bottom end terminal of the elevator shaft.

4. The elevator according to claim 3, wherein the safety monitoring unit is configured to cause the braking of the elevator car with the electromechanical braking apparatus to decelerate the car speed to an allowed buffer impact speed upon determination of the slowdown failure in the proximity of the bottom end terminal.

5. The elevator according to claim 1, further comprising an inductive braking apparatus configured to brake the movement of the elevator car, and wherein the safety monitoring unit is configured to cause the braking of the elevator car with the electromechanical braking apparatus in tandem with the inductive braking apparatus to decelerate the car speed to the terminal speed of the top end terminal or the bottom end terminal upon the determination of the slowdown failure.

6. The elevator according to claim 5, wherein the safety monitoring unit is configured to cause the braking of the elevator car with the electromechanical braking apparatus in tandem with the inductive braking apparatus to decelerate the car speed to an allowed buffer impact speed upon the determination of the slowdown failure in the proximity of the bottom end terminal.

7. The elevator according to claim 1, wherein the electromechanical braking apparatus comprises two electromechanical brakes configured to apply a braking force to brake the movement of the elevator car.

8. The elevator according to claim 1, wherein the electromechanical braking apparatus comprises two electromechanical hoisting machinery brakes.

9. The elevator according to claim 5, wherein the inductive braking apparatus comprises at least one inductive braking devices.

10. The elevator according to claim 5, comprising:

a first monitoring circuit configured to indicate operation of the electromechanical braking apparatus; and a second monitoring circuit configured to indicate operation of the inductive braking apparatus, wherein the safety monitoring unit is communicatively connected to the first monitoring circuit and to the second monitoring circuit and is configured to cause a safety shutdown of the elevator based on an indication of a malfunction of at least one of the electromechanical braking apparatus and the inductive braking apparatus.

11. The elevator according to claim 10, wherein the first monitoring circuit comprises a sensor configured to sense at least one of position and movement of an armature of the electromechanical braking apparatus, the sensor comprising one of a switch and a proximity sensor.

12. The elevator according to claim 10, wherein the inductive braking apparatus comprises a mechanical contactor having at least two contacts configured to short phases of an elevator hoisting machine, and wherein the second monitoring circuit comprises at least two auxiliary contacts of the mechanical contactor, said at least two auxiliary contacts configured to respectively co-act with the at least two contacts to indicate switching states of the at least two contacts.

13. The elevator according to claim 1, wherein the electromechanical braking apparatus is dimensioned to stop the elevator car when the elevator car is travelling downward at nominal speed and with a 25% overload.

14. The elevator according to claim 1, wherein the elevator further comprises an inductive braking apparatus configured to brake the movement of the elevator car, and wherein a combination of the electromechanical braking apparatus and the inductive braking apparatus is dimensioned to decelerate the car speed from the maximum initial speed to the terminal speed of the top end terminal or the bottom end terminal within a distance between the closest possible position of the approaching elevator car and the top end terminal or the bottom end terminal.

15. The elevator according to claim 5, wherein the safety monitoring unit is configured to provide a common control signal to control the electromechanical braking apparatus in tandem with the inductive braking apparatus.

16. The elevator according to claim 5, wherein the safety monitoring unit is configured to provide separate control signals for the electromechanical braking apparatus and the inductive braking apparatus.

17. An elevator comprising:

an elevator car vertically movable in an elevator shaft, the elevator shaft including top and bottom end terminals;

an electromechanical braking apparatus configured to brake movement of the elevator car; and a safety monitoring unit configured to determine a position of the elevator car based on measured position data of the elevator car and car speed of the elevator car based on measured speed data of the elevator car, calculate from the measured speed data, with a maximum acceleration, a speed prediction for the car speed after a reaction time of the electromechanical braking apparatus, calculate from the measured position data, with the maximum acceleration, a closest possible position of an approaching elevator car to the top end terminal or the bottom end terminal after the reaction time of the electromechanical braking apparatus, calculate a maximum initial speed for the elevator car to decelerate from the closest possible position to a terminal speed of the top end terminal or the bottom end terminal, and cause braking of the elevator car with the electromechanical braking apparatus in response to the speed prediction meeting or exceeding the maximum initial speed.

18. The elevator according to claim 17, further comprising an inductive braking apparatus configured to brake the movement of the elevator car, and wherein the safety monitoring unit is configured to cause the braking of the elevator car with the electromechanical braking apparatus in tandem with the inductive braking apparatus to decelerate the car speed to the terminal speed of the top end terminal or the bottom end terminal when the speed prediction meets or exceeds the maximum initial speed.

19. The elevator according to claim 18, wherein the safety monitoring unit is configured to cause the braking of the elevator car with the electromechanical braking apparatus in tandem with the inductive braking apparatus to decelerate the car speed to an allowed buffer impact speed when the speed prediction meets or exceeds the maximum initial speed in a proximity of the bottom end terminal.

* * * * *